Figure 1:
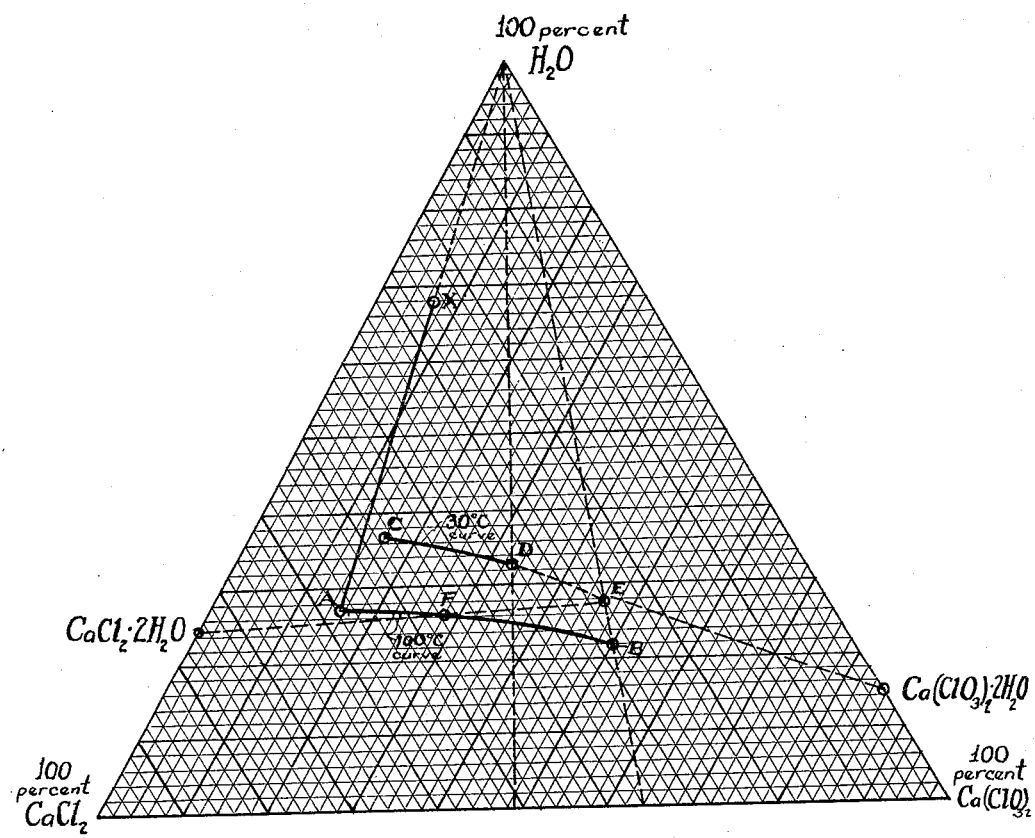

Nov. 15, 1932.  S. B. HEATH  1,887,809

MANUFACTURE OF CALCIUM CHLORATE

Filed Jan. 30, 1930

INVENTOR
BY Sheldon B. Heath
Thomas Griswold, Jr.
ATTORNEY

Patented Nov. 15, 1932

1,887,809

UNITED STATES PATENT OFFICE

SHELDON B. HEATH, OF MIDLAND, MICHIGAN, ASSIGNOR TO THE DOW CHEMICAL COMPANY, OF MIDLAND, MICHIGAN, A CORPORATION OF MICHIGAN

MANUFACTURE OF CALCIUM CHLORATE

Application filed January 30, 1930. Serial No. 424,493.

The present invention relates to improvements in the manufacture of chlorates and has particular regard to the preparation of calcium chlorate and the separation of the same from solutions containing calcium chloride by direct crystallization methods.

A well known method for preparing chlorates consists in absorbing chlorine in milk of lime to form a solution of calcium chloride and calcium chlorate. The solution is then treated with potassium chloride in order to form by transposition the difficultly soluble potassium chlorate, the latter then being separated by crystallization from the solution of calcium chloride. In a modification of the foregoing method, as described in Jour. Soc. Chem. Ind. 1; 40-42 (1882), the solution of calcium chloride and calcium chlorate is first concentrated and cooled so as to crystallize out a portion of the calcium chloride before treating with potassium chloride, the calcium chloride content having been reduced in this way to about 1.2 moles $CaCl_2$ to 1 mole $Ca(ClO_3)_2$. Treatment of the residual solution with lime enables the calcium chloride content to be further reduced to as low as .3 mole $CaCl_2$ to 1 mole $Ca(ClO_3)_2$, but, so far as I am aware, it has not hitherto been found possible to lower the calcium chloride content below about 1.2 moles $CaCl_2$ to 1 mole $Ca(ClO_3)_2$ by straight crystallization methods without having recourse to any auxiliary chemical treatment.

For many purposes for which chlorates are commercially employed it is desirable, if not imperative, that a less costly material than the potassium salt be supplied, as, for example, in the manufacture of herbicidal preparations and the like. Obviously the cheapest chlorate would be the calcium salt, provided it could be prepared in sufficiently pure form at a reasonable cost. I have now found that by suitable procedure a pure crystalline calcium chlorate may be prepared solely by crystallization methods from solutions containing calcium chloride and calcium chlorate. The invention, then, consists of the improved process hereinafter described and claimed, the annexed drawing and following description setting forth but a few of the various ways in which the principle of the invention may be used.

In said annexed drawing:—

The single figure is a chart showing curves for the composition of mixed solutions of calcium chloride and calcium chlorate saturated with $CaCl_2.2H_2O$ at the temperature 30° and 100° C., respectively.

I have discovered that the equilibrium composition of saturated mixed solutions of calcium chloride and calcium chlorate consists of an increasingly higher ratio of the latter to the former with rising temperatures. It, therefore, becomes possible, by determining such ratio at various temperatures, to devise methods for crystallizing the chlorate from solutions containing the chloride by first concentrating the mixed solution approximately to saturation with respect to both the chloride and chlorate at a suitably elevated temperature, separating the $CaCl_2.2H_2O$ crystals thereby precipitated, adjusting the concentration of the residual solution, if necessary, to a figure corresponding to super-saturation with the chlorate as $Ca(ClO_3)_2.2H_2O$ but short of saturatiton with chloride at a selected lower temperature, then cooling to such lower temperature and crystallizing out chlorate as the dihydrated salt.

The foregoing solubility relations may be more clearly understood by referring to the drawing which shows, for illustrative purposes, solubility curves for the system calcium chloride, calcium chlorate and water at the temperatures 30° and 100° C. within the range of saturation with respect to calcium chloride dihydrate, $CaCl_2.2H_2O$ and up to the point of saturation with respect to calcium chlorate. The corresponding curves for other temperatures have been omitted to simplify the explanation and avoid the confusion entailed by the use of a multiplicity of temperature curves. Such corresponding isotherms for temperatures below 30° C., however, would lie on the chart above and slightly to the right of the 30° isotherm and for temperatures above 100° C. they would lie below and to the left of the 100° isotherm, while for intermediate temperatures they would lie between the two curves shown. The 100° C. curve shows that a solution containing, for example, approximately 57 parts $CaCl_2$, 16 parts $Ca(ClO_3)_2$ and 27 parts water, by weight, indicated by the point A, is just saturated with respect to calcium chloride (as the dihydrate $CaCl_2.2H_2O$). If the solution is concentrated further, as by evaporation, $CaCl_2.2H_2O$ will be precipitated and the composition of the saturated solution will follow along the curve until the point B is reached where the three components are present in the proportion of 28 parts $CaCl_2$, 50 parts $Ca(ClO_3)_2$ and 22 parts water and the solution becomes saturated also with respect to calcium chlorate. Continued concentration beyond this point will then result in the crystallization of chloride and chlorate together in the equilibrium ratio by weight of $\frac{28}{50}$, or a molecular ratio of very nearly $\frac{1}{1}$. Consequently it is not possible to effect a further separation of the two salts by crystallization at 100° C.

Referring now to the 30° isotherm, the mixed salt solution is saturated with respect to calcium chloride (as $CaCl_2.2H_2O$) at, for example, a point C corresponding to a content of 47 parts $CaCl_2$, 16 parts $Ca(ClO_3)_2$ and 37 parts water. Further concentration of the solution results in precipitating crystals of $CaCl_2.2H_2O$, while the composition of the solution follows along the curve to point D whereat saturation with respect to calcium chlorate also is reached, the ratio of $CaCl_2$ to $Ca(ClO_3)_2$ at this point being $\frac{34}{33}$ by weight, or about $\frac{2}{1}$ on a molecular basis. Under normal behavior, therefore, continued concentration at 30° C. would result in crystallizing out a mixture of the two salts in the same ratio. I have found, however, that actually such normal crystallization does not occur and that the water content of the solution may be reduced to about 28 per cent., represented by point E, whereat the ratio of calcium chloride to calcium chlorate in the solution is about $\frac{26}{46}$, with continued crystallization of $CaCl_2.2H_2O$ alone along the dotted line DE while the solution becomes supersaturated with respect to calcium chlorate. Not until a greater concentration than that represented by point E is attained will crystals of calcium chlorate be precipitated spontaneously. At a point on the curve between D and E, however, crystallization of calcium chlorate as $Ca(ClO_3)_2.2H_2O$ may be induced by inoculating or "seeding" the solution with such crystals, and thereafter such crystallization will proceed until the true equilibrium composition, as represented by point D, has been restored.

It thus becomes feasible to crystallize substantially pure calcium chlorate in the form of the dihydrate $Ca(ClO_3)_2.2H_2O$ from a solution containing calcium chloride and calcium chlorate by suitably adjusting the composition of such solution to produce therein at a temperature of about 30° C. a ratio of $CaCl_2$ to $Ca(ClO_3)_2$ by weight between the limits expressed as $\frac{34}{33}$ and $\frac{26}{46}$, and a corresponding water content between 33 and 28 per cent., represented by the points D and E of the drawing. After so adjusting the composition and concentration of the solution at about 30° C., or below, crystallization of calcium chlorate may be induced by inoculating with some of the crystals. By so crystallizing a solution of composition represented by point E to produce a residual solution of composition represented by point D, it is possible to separate as much as approximately 40 per cent. of the calcium chlorate content as pure crystals of composition $Ca(ClO_3)_2.2H_2O$.

In applying the foregoing newly discovered facts to a practical process for the preparation of calcium chlorate crystals I may proceed in a variety of ways. For instance, I may concentrate a solution of the mixed salts at 100° C., for example, or at any other suitably elevated temperature, with separation of $CaCl_2.2H_2O$ crystals, until the concentrated solution reaches or at least closely approaches saturation with respect to $Ca(ClO_3)_2$, as at B. The hot solution is then diluted with water to adjust the composition thereof to a corresponding point on the 30° curve, as indicated by E, or to an equivalent point on the curve for any other temperature of about 30° C. Then, by cooling the diluted solution to such temperature and inoculating with $Ca(ClO_3)_2.2H_2O$ crystals, crystallization thereof will be caused to take place until the composition of the residual solution has been brought back to the equilibrium point corresponding to D. The crystals may be separated from the mother liquor and the latter reworked in a similar way or returned for admixing with more of the original solution.

Another convenient mode of procedure well adapted to commercial operation consists in evaporating a solution containing calcium chloride and calcium chlorate at about 100° C. or other convenient temperature with concomitant salting out of crystals of $CaCl_2.2H_2O$, but stopping the concentration at a point short, of saturation with $Ca(ClO_3)_2$, as at F, such that when the solution is cooled to about 30° C. a further concentration with respect to chlorate takes place by separation of more $CaCl_2.2H_2O$ crystals, the solution composition changing as indicated along dotted line FE, but no separation of calcium chlorate crystals will occur. The cooled mother liquor constituting a super-saturated solution of calcium chlorate is separated from $CaCl_2.2H_2O$ crystals salted out by the previous evaporation and cooling, then inoculated with $Ca(ClO_3)_2.2H_2O$ crystals and preferably agitated to promote crystallization of the latter salt which continues until the equalibrium composition of the solution, shown by point D, is attained. The calcium chlorate crystals, amounting to about 35 to 40 per cent. of the total chlorate content of the solution are filtered off and the mother liquor returned to the process.

A crude calcium chlorate liquor which may be used as the raw material for the process is prepared by absorption of chlorine in milk of lime according to the known method. A representative analysis of the crude liquor is as follows:—

| | Per cent |
|---|---|
| $CaCl_2$ | 25.1 |
| $Ca(ClO_3)_2$ | 6.8 |
| $Ca(ClO)_2$ | 0.1 |
| $H_2O$ | 68.0 |

The molecular ratio of calcium chloride to calcium chlorate in the above solution is $\frac{6.82}{1}$.

This ratio is subject to more or less variation dependent upon the conditions under which the crude liquor has been prepared, but in general may be expected to range between about $\frac{5}{1}$ and $\frac{9}{1}$.

The hot solution, having a slightly alkaline reaction is first given a preliminary treatment with sulphur dioxide or sodium bisulphite to remove the small amount of hypochlorite. The treated liquor is then filtered and the clear filtrate, having a composition indicated by point X on the drawing, becomes the feed solution to be further processed for the separation of calcium chloride and calcium chlorate by either one of the general procedures just described, or by any convenient modification or combination thereof. For example, the solution is concentrated by evaporation under reduced pressure at approximately 100° C., the composition of the solution following along line XA as evaporation proceeds. When the concentration has reached the point indicated by point A, the solution becomes saturated with respect to $CaCl_2.2H_2O$. Continued evaporation is now accompanied by salting out of crystals of such composition, while the composition of the solution varies as indicated along the curve AB. By carrying out the concentration in a "salting-out" type of evaporator and continuing until the composition of the solution approaches a molecular ratio of $$\frac{CaCl_2}{Ca(ClO_3)_2} = \frac{1}{1}$$

and a water content of 22 per cent. by weight, i. e. corresponding to point B, a final slurry of crystals in a mother liquor saturated, or nearly so, with respect to both $CaCl_2.2H_2O$ and $Ca(ClO_3)_2$ is obtained. The crystals of $CaCl_2.2H_2O$ are filtered and drained from the mother liquor, and preferably washed with water. The mother liquor is diluted to a water content of about 28 per cent., represented by point E, and then cooled to about 30° C. The cooled solution is inoculated with crystals of $Ca(ClO_3)_2.2H_2O$ and the whole agitated to promote crystallization of the latter salt which proceeds until the composition of the residual solution reaches equilibrium as represented by point D. The crystals are separated from the mother liquor and the latter returned to the process.

The calcium chlorate crystals obtained directly are suitable for certain purposes without washing or further purification, and may be packaged direct as a somewhat moist, granular mass, containing about 4 to 6 per cent. $CaCl_2$, which does not harden or cake in the container. To prepare a purified product the above crystals may be washed to remove adhering mother liquor, the wash water being returned to the process and the washed crystals obtained with a content of less than 1 per cent. $CaCl_2$. Instead of or in addition to washing the crude crystals as aforesaid, the crude or washed crystals may be dissolved in a small amount of hot water and recrystallized therefrom. An aqueous calcium chlorate solution containing 33 per cent. water is saturated with respect to the dihydrated salt $Ca(ClO_3)_2.2H_2O$ at 30° C. If the hot solution is concentrated, however, to the point where crystals are precipitated directly therefrom at a temperature above about 60° to 67° C., which is the transition point range of $Ca(ClO_3)_2.2H_2O$ to anhydrous $Ca(ClO_3)_2$ in the presence of solutions containing calcium chloride, such crystals will be in the anhydrous form.

The temperatures of 30° and 100° C., respectively, for which saturated solution composition curves are shown in the drawing, have been selected to illustrate the principle underlying my improved process and because such temperatures are conveniently attainable in practice. The invention is not limited to the employment of such temperatures exclusively, however, and the process may be carried out at other temperatures if so desired, without exceeding the scope of the invention. For example, temperatures higher or lower than 100° C. may be employed for the initial concentration of the mixed salt solution. If desired, preliminary concentration of the feed solution may be conducted by evaporating at atmospheric pressure, the final concentration to the desired point alone being performed under vacuum at a temperature, preferably, between about 70° and 100° C. Again, the concentration may be entirely carried out at atmospheric pressure and the corresponding temperature, and crystallization of $CaCl_2.2H_2O$ effected by controlled cooling of the concentrated solution to about 30° C. In general, however, the most economical procedure is to concentrate in a "salting-out" type of evaporator under vacuum at about 80° to 100° C.

Temperatures of between 80° and 100° C. are preferred for the concentration, for one reason, to avoid corrosion of apparatus, which becomes of conseqence at higher temperature, and also because the consistency of the saturated solution at such temperatures permits forming a slurry of calcium chloride crystals and mother liquor which is readily pumped and upon filtering enables the mother liquor to be drained from the crystals leaving the latter with a minimum chlorate content. At lower temperatures the crystals are obtained with a larger content of chlorate and a thicker, more viscous crystal slurry is produced which is less convenient to handle. The concentration may be carried to the point where all of the separated calcium chloride is salted out in the boiling solution and the solution then diluted with water sufficiently to prevent any crystallization of calcium chloride along with the chlorate after the solution has been cooled, and then cooling to the point where calcium chlorate may be crystallized out by inoculating the solution with some of the crystals. By an alternative mode of procedure the concentration may be stopped at any point short of complete salting out of the calcium chloride separable from the chlorate by crystallization, and then cooling, with or without diluting as necessary, to crystallize out the remainder of the chloride and leave a super-saturated chlorate solution in which the crystallization of the latter salt may be induced by inoculation.

Cooling of the concentrated solution to about 30° C. has the practical advantage that it may ordinarily be done with water from natural sources without requiring artificial refrigeration. Somewhat higher temperatures may be employed in this step, although less desirable as the yield of chlorate crystals will be less. Conversely, cooling to temperatures below 30° C., such as may be practicable in periods of winter operation, results in a somewhat greater yield of the crystals.

From the foregoing it is demonstrated that calcium chlorate may be separated from solutions containing both calcium chloride and calcium chlorate wherein the molecular ratio of chloride to chlorate is between $\frac{2}{1}$ and $\frac{1}{1}$ by crystallization as the dihydrate $$Ca(ClO_3)_2.2H_2O$$

from the suitably concentrated solution. The degree of concentration required will vary with the temperature at which crystallization is carried out. Any temperature below about 67° C., the transition point of $Ca(ClO_3)_2.2H_2O$ to $Ca(ClO_3)_2$, may be employed for the crystallization, but, for practical reasons already stated, I prefer a temperature between about 20° and 40° C., or under average conditions a temperature of about 30° C. At such last mentioned temperature the concentration of the solution is to be such that the water content thereof is less than 33 per cent. by weight but not lower than 28 per cent. If the solution is more dilute no crystallization of chlorate can occur, while if more concentrated some chloride will crystallize along with the chlorate.

Any solution of calcium chloride and calcium chlorate in which the molecular ratio of chloride to chlorate is greater than $\frac{1}{1}$ may be worked up for the recovery of calcium chlorate according to the process of this invention by first concentrating to salt out, if necessary, a portion of such chloride as $CaCl_2.2H_2O$ and leave a residual solution in which the ratio of chloride to chlorate is less than $\frac{2}{1}$, adjusting the concentration of such residual solution so that when cooled to any desired temperature below 67° C. it will be supersaturated with respect to $Ca(ClO_3)_2.2H_2O$, but short of saturation with respect to $CaCl_2.2H_2O$, then cooling and crystallizing out chlorate as the dehydrate $Ca(ClO_3)_2.2H_2O$. Such latter crystallization is normally very sluggish and takes place of itself exceedingly slowly, such that the solutions may become considerably supersaturated and so remain for a long period without material crystallization of chlorate. However by inoculating with some of the crystals, crystallization may be readily induced so that the operation is completed in a short time.

By evaporating a calcium chloride-calcium chlorate solution at a temperature above 100° C., accompanied by crystallization of $CaCl_2.2H_2O$ until the point is reached whereat precipitation of crystals of anhydrous $Ca(ClO_3)_2$ also commences, it is possible to prepare a concentrated solution in which the molecular ratio of chloride to chlorate is somewhat less than $\frac{1}{1}$, from which upon diluting and cooling the chlorate may be crystallized in the same way as described above. Likewise, by cooling a hot concentrated solution of the chloride and chlorate to a temperature below 30° C., a super-saturated chlorate solution may be prepared in which the above ratio is somewhat less than $\frac{1}{1}$. In either case the process of the present invention may be applied for separating pure chlorate crystals, although with less advantage for reasons already stated. In its broad aspects, therefore, my improved process includes crystallizing calcium chlorate as $Ca(ClO_3)_2.2H_2O$ from any solution of calcium chloride and calcium chlorate which is unsaturated with respect to $CaCl_2.2H_2O$ but wherein a condition of saturation or supersaturation with respect to $Ca(ClO_3)_2.2H_2O$ has been created.

Other modes of applying the principle of my invention may be employed instead of the one explained, change being made as regards the process herein disclosed, provided the step or steps stated by any of the following claims or the equivalent of such stated step or steps be employed.

I therefore particularly point out and distinctly claim as my invention:—

1. The process of separating calcium chlorate from a solution thereof containing calcium chloride which comprises crystallizing the former as $Ca(ClO_3)_2.2H_2O$ from such solution wherein the molecular ratio of chloride to chlorate is between 2/1 and 1/1.

2. The process of separating calcium chlorate from a solution thereof containing calcium chloride wherein the molecular ratio of said chloride to said chlorate is greater than 1/1 which comprises establishing therein a molecular ratio of calcium chloride to calcium chlorate less that $\frac{2}{1}$ and a water content between 28 and 33 per cent. by weight and crystallizing said chlorate as $Ca(ClO_3)_2.2H_2O$.

3. The process of separating calcium chlorate from a solution thereof containing calcium chloride wherein the molecular ratio of said chloride to said chlorate is greater than 1/1 which comprises concentrating such solution to crystallize a portion of said chloride as $CaCl_2.2H_2O$, whereby the ratio of chloride to chlorate is lowered, separating such crystals and crystallizing said chlorate from the residual solution as $Ca(ClO_3)_2.2H_2O$.

4. The process of separating calcium chlorate from a solution thereof containing calcium chloride wherein the molecular ratio of said chloride to said chlorate is greater than 2/1 which comprises concentrating such solution to crystallize a portion of said chloride as $CaCl_2.2H_2O$ and leave a residual solution having a molecular ratio of chloride to chlorate between 2/1 and 1/1, separating such crystals and crystallizing said chlorate from the residual solution as $Ca(ClO_3)_2.2H_2O$.

5. The process of separating calcium chlorate from a solution thereof containing calcium chloride wherein the molecular ratio of said chloride to said chlorate is greater than 2/1 which comprises concentrating such solution to crystallize a portion of said chloride as $CaCl_2.2H_2O$ and leave a residual solution having a molecular ratio of chloride to chlorate between 2/1 and 1/1, separating such crystals, adjusting the concentration of the residual solution so that when cooled to a temperature below 67° C. the solution will be supersaturated with respect to $Ca(ClO_3)_2.2H_2O$, but short of saturation with respect to $CaCl_2.2H_2O$, cooling and crystallizing said chlorate therefrom as $Ca(ClO_3)_2.2H_2O$.

6. The process of separating calcium chlorate from a solution thereof containing calcium chloride wherein the molecular ratio of said chloride to said chlorate is greater than 2/1 which comprises concentrating such solution by evaporation to crystallize a portion of said chloride as $CaCl_2.2H_2O$ and leave a residual solution having a molecular ratio of chloride to chlorate between 2/1 and 1/1, separating such crystals, adjusting the concentration of the residual solution so that when cooled to a temperature of about 30° C. the solution will be supersaturated with respect to $Ca(ClO_3)_2.2H_2O$, but short of saturation with respect to $CaCl_2.2H_2O$, cooling to about 30° C. and inducing crystallization of said chlorate as $Ca(ClO_3)_2.2H_2O$ by inoculating with crystals thereof.

7. The process of separating calcium chlorate from a solution thereof containing calcium chloride wherein the molecular ratio of said chloride to said chlorate is greater than 2/1 which comprises concentrating such solution by evaporation to crystallize a portion of said chloride as $CaCl_2.2H_2O$ and leave a residual solution having a molecular ratio of chloride to chlorate between 2/1 and 1/1, separating such crystals, adjusting the concentration of the residual solution to have a water content of approximately 28 per cent. by weight, cooling to a temperature between 20° and 40° C., and inducing crystallization of said chlorate as $Ca(ClO_3)_2.2H_2O$ by inoculating with crystals thereof.

8. The process of separating calcium chlorate from a solution thereof containing calcium chloride wherein the molecular ratio of said chloride to said chlorate is greater than 2/1 which comprises concentrating such solution by evaporation to crystallize a portion of said chloride as $CaCl_2.2H_2O$ and leave a residual solution having a molecular ratio of chloride to chlorate of approximately 1/1, separating such crystals, diluting the residual solution to a water content of about 28 per cent. by weight, cooling to about 30° C. and inducing crystallization of said chlorate therein as $Ca(ClO_3)_2.2H_2O$ by inoculating with crystals thereof.

9. A process of crystallizing calcium chlorate from a solution thereof containing calcium chloride which comprises preparing a solution of said chloride and chlorate in which the ratio of chloride to chlorate is greater than $\frac{2}{1}$ and which is saturated with respect to $CaCl_2.2H_2O$ at a temperature above 67° C., cooling to a temperature between 20° and 40° C. to precipitate a portion of said chloride as $CaCl_2.2H_2O$ in a mother liquor in which the molecular ratio of chloride to chlorate is between $\frac{2}{1}$ and $\frac{1}{1}$ separating the crystals of $CaCl_2.2H_2O$ and crystallizing calcium chlorate from the cooled mother liquor as $Ca(ClO_3)_2.2H_2O$.

10. A process of the character described which comprises preparing a solution of calcium chloride and calcium chlorate in which the molecular ratio of chloride to chlorate is greater than $\frac{2}{1}$, concentrating the same by evaporation at a temperature above about 80° C. to precipitate a portion of said chloride as $CaCl_2.2H_2O$, then cooling to a temperature below 67° C., whereby more crystals of $CaCl_2.2H_2O$ are formed to produce a slurry of such crystals in a mother liquor having the molecular ratio of chloride to chlorate between $\frac{2}{1}$ and $\frac{1}{1}$, separating the crystals, crystallizing calcium chlorate from the cooled mother liquor as $Ca(ClO_3)_2.2H_2O$ and separating the last-mentioned crystals.

11. A process of the character described which comprises preparing a solution of calcium chloride and calcium chlorate in which the molecular ratio of chloride to chlorate is greater than $\frac{2}{1}$, concentrating the same by evaporation in vacuo at a temperature of about 100° C. to crystallize a portion of said chloride as $CaCl_2.2H_2O$, then cooling to a temperature of about 30° C. to crystallize a further portion of said chloride as $CaCl_2.2H_2O$ and produce a slurry of such crystals in a mother liquor in which the molecular ratio of chloride to chlorate is between $\frac{2}{1}$ and $\frac{1}{1}$, separating the crystals and crystallizing calcium chlorate from the cooled mother liquor as $Ca(ClO_3)_2.2H_2O$ and separating the last-mentioned crystals.

12. A process of the character described which comprises preparing a solution of calcium chloride and calcium chlorate, concentrating the same by evaporation in vacuo at a temperature of about 100° C. to produce a slurry of crystals of $CaCl_2.2H_2O$ in a mother liquor containing about 22 per cent. water by weight, separating such crystals, diluting the mother liquor to a water content of about 28 per cent., cooling the same to a temperature of approximately 30° C., crystallizing calcium chlorate as $Ca(ClO_3)_2.2H_2O$ therefrom and separating the crystals from the final mother liquor.

13. A process of the character described which comprises preparing a solution of calcium chloride and calcium chlorate, concentrating the same by evaporation in vacuo at a temperature of about 100° C. to produce a slurry of crystals of $CaCl_2.2H_2O$ in a mother liquor containing about 22 per cent. water by weight, separating such crystals, diluting the mother liquor to a water content of about 28 per cent., cooling the same to a temperature of approximately 30° C., inducing crystallization of calcium chlorate as $Ca(ClO_3)_2.2H_2O$ in the mother liquor by inoculating with crystals thereof, separating the crystals from the final mother liquor and returning the latter to the first step.

14. The process of crystallizing calcium chlorate from a solution thereof containing calcium chloride in which the molecular ratio of chloride to chlorate is less than $\frac{2}{1}$ which comprises concentrating the solution at a temperature above 67° C. to a water content below 33 per cent. by weight but above that at which calcium chlorate crystals are formed and then cooling to a temperature below 67° C. to crystallize $Ca(ClO_3)_2.2H_2O$ from the solution.

15. In a process of crystallizing calcium chlorate from a solution thereof containing calcium chloride in which the molecular ratio of chloride to chlorate is less than $\frac{2}{1}$ and the water content is less than 33 per cent by weight, the step which consists in crystallizing $Ca(ClO_3)_2.2H_2O$ from the solution at a temperature below 67° C.

16. In a process of crystallizing calcium chlorate from a solution thereof containing calcium chloride in which the molecular ratio of chloride to chlorate is less than $\frac{2}{1}$ and the water content is less than 33 per cent by weight, the step which consists in inoculating such solution at a temperature below 67° C. with crystals of $Ca(ClO_3)_2.2H_2O$ to induce crystallization of such dihydrated salt therein.

Signed by me this 22nd day of January, 1930.

SHELDON B. HEATH.